United States Patent [19]
Gerhardt

[11] 4,015,376
[45] Apr. 5, 1977

[54] APPARATUS FOR STABILIZING A MOBILE HOME ROOF

[76] Inventor: Leslie L. Gerhardt, 1001 Ranch Road, Rte. 1, Cedar Hill, Tex. 75104

[22] Filed: Apr. 12, 1976

[21] Appl. No.: 675,957

[52] U.S. Cl. .................................. 52/23; 52/4; 52/143

[51] Int. Cl.² ............................... E04B 7/00

[58] Field of Search ............... 52/2, 23, 3–5, 52/63, 143

[56] References Cited

UNITED STATES PATENTS

| | | | |
|---|---|---|---|
| 459,664 | 9/1891 | Wands | 52/23 |
| 1,244,763 | 10/1917 | Neumayer | 52/23 |
| 2,133,088 | 10/1938 | Faber | 52/23 X |
| 3,088,558 | 5/1963 | Dickinson | 52/23 |
| 3,309,822 | 3/1967 | Dunkin | 52/23 |
| 3,336,704 | 8/1967 | Clay | 52/23 |
| 3,769,763 | 11/1973 | Kwake | 52/2 |
| 3,927,494 | 12/1975 | Struben | 52/23 |

*Primary Examiner*—Alfred C. Perham
*Attorney, Agent, or Firm*—Charles W. McHugh

[57] ABSTRACT

A mobile home having a membrane-type roof is stabilized by placement of a plurality of tensioned straps extending transversely across the membrane roof and in contact with the roof over a substantial portion of the length of said straps. The straps are anchored to a structural member at the edge of the roof, so that the straps constitute a permanent part of the mobile home. Hence, during transportation of the home along a highway, as well as during wind storms, etc., any upward flexing of the membrane roof is prevented by the tensioned straps which lie adjacent said roof. A suitable strap may be a 1200 pound test braided nylon rope having a diameter of about ¼ inch. Springs for achieving tension in the rope may be helical springs about 16 inches long and having a diameter of about ½ inch, with said springs being made from steel wire having a diameter of about 1/32 inch. The springs should be capable of establishing a tension of about 30 pounds in the straps which lie adjacent the roof, even when the wind load is zero.

9 Claims, 3 Drawing Figures

APPARATUS FOR STABILIZING A MOBILE HOME ROOF

This invention relates generally to roofing systems for mobile homes and the like, and more particularly it relates to a technique for minimizing any vertical movement of a roof membrane when said membrane is subjected to wind loads.

Mobile homes are becoming increasingly popular as permanent residences in the U.S. It was estimated in 1970 that there were some 2,000,000 mobile homes being utilized as permanent residences, which was some 135% more than the total in 1960. And, in 1970 alone, there were some one-half million new mobile homes purchased by individuals for residential purposes. Apart from the fact that mobile homes offered an attractive and low-cost alternative to conventional single-family residential housing, it is believed that the trend towards wider mobile homes has made them increasingly attractive to potential owners. That is, the relatively recent trend of making homes 12 to 14 feet wide, as well as providing double-wide configurations, has caused mobile homes to lose some of the previous "cramped" character that typified mobile homes of a generation ago.

While wider mobile homes have definitely made the internal arrangements of furniture, fixtures and rooms more flexible, such wider homes have also accentuated a problem involving the structural integrity of roofs. The problem being referred to arises by virtue of the fact that the typical roof for many mobile homes is formed by a set of longitudinal and transverse roofing trusses and braces which are covered with relatively thin sheets of metal that are frequently called roofing membranes. Generally speaking, roofing membranes are rigidly attached to the roof framework only along the sides of the mobile home. The result of this is that there is a substantial transverse distance (from one side of the mobile home to the other) over which a roofing membrane is not rigidly attached to any structural member. For the occupant of a mobile home, the "floating" nature of a roof membrane is of no particular consequence on those days in which there is little or no wind blowing. But, on windy days, the absence of any rigid connection between the center of the membrane and the supporting roof members causes many such membranes to vibrate in response to wind loads. This vibration may produce several different effects, as standing waves are alternatively established and damped—producing a so-called "ripple" effect in the membranes. While the vibration of a floating membrane against a fixed supporting truss may not be so severe as to cause a structural failure, even the slightest vibration can create enough noise to cause a significant acoustic problem, sometimes called "roof rumble". Some occupants of mobile homes reportedly find the noise of a "flapping" roof to be so offensive and distracting that it even interferes with the quiet enjoyment of a book or a television program. Hence, there has long been a significant need for a statisfactory technique for precluding the vibration of a roof membrane when the same is subjected to even modest wind loads.

By suggesting that there has long been a need for some way to efficiently avoid roof vibration, it is not intended to infer that there have been no solutions to the problem—because, truly, there have been. But, these previously known solutions are not exactly what a person would likely describe as ornamental or aesthetically pleasing. For example, some persons have been known to place discarded automobile tires on top of their mobile homes in order to weight down the membranes, thereby quieting the roof. Other persons have been known to place relatively heavy beams of wood on the roofs of their mobile homes. But it must be remembered that any loose object put on a roof is capable of becoming a dangerous projectile if a storm should generate sufficient winds to blow that object off the roof. Too, placing additional dead weight on a roof reduces the remaining loading (from, say, snow) that such a roof can tolerate before it might fail as a result of overloading. So, the technique of eliminating roof vibration by placing weights on the top of the roof is obviously not an ideal way of solving the problem.

Additionally, attempting to stabilize a roof by putting discarded tires or other objects on it can only work when the mobile home is static; as an obvious safety risk, such objects would have to be removed before the home was moved very far. Hence, when the home is being transported along a highway at, say 35 m.p.h., then the roof may be subjected to relative wind movement of 35 m.p.h. or more. Of course, there should be no one riding in a mobile home which is being transported, so the noise that attends vibration of the roof membranes should not be offensive to someone within the home. However, the risk of structural damage to the seams that join two adjacent roof panels is still present when the panels have any freedom to move. Some persons have attempted to restrict this freedom and thereby "quiet" their roof by placing wood screws or the like through a roof membrane into the underlying roof trusses. They usually find, though, that all of their wood screws have been pulled loose if it ever becomes necessary to move their home for a few miles along city streets and the like, where flexing of the mobile home's understructure causes relative movement between parts of the superstructure. Thus, moving a mobile home from one site to another at significant speeds is particularly hard on the integrity of a roof, since it combines an artificial wind load with what may be a particularly strenuous test of the home's structural beams—particularly if the home has a length of 40 feet or more.

Of course, the problem of safely (and quietly) maintaining the integrity of a mobile home roof obviously did not halt the proliferation of mobile homes in recent years. But, the increased number of such homes did begin to affect so many people that the U.S. Congress eventually took note of the need for some legislation to control and regulate the construction of mobile homes. In 1974, Congress passed the National Mobile Home Construction and Safety Standards Act; and, on June 25, 1975, the Department of Housing and Urban Development proposed construction and safety regulations for the industry, pursuant to the 1974 Act. On the subject of roofing membranes, these HUD regulations provide that "Roofing membranes shall be of sufficient rigidity to prevent deflection which would permit ponding of water or separation of seams due to wind, snow, ice, errection or transportation forces." According to a notice in the Federal Register on Sept. 2, 1975, the proposed regulations were to take effect on Mar. 15, 1976. Naturally, it remains to be seen whether these new regulations for the mobile home industry will have the effect of precluding the membrane-fluttering problem herein referred to. But, even if newly constructed mobile homes do not have the aforementioned noise problems, there are certainly millions of homes already in existence that were produced prior to Mar. 15, 1976; and it is presumed that many of these mobile homes have experienced at least some degree of roof fluttering as described herein at certain times during transporation or wind storms. Hence, it is believed there are a substantial number of mobile homes already in existence that presumably need something to minimize the "flutter" of roof membranes. Accordingly, it is an object of this invention to provide an apparatus which will satisfy the aforementioned need.

It is a further object of this invention to provide a technique for precluding relative movement in a vertical direction between a roof membrane and an underlying roof truss.

Another object is to provide a light-weight device which is readily installed and which does not substantially impair the aesthetic appearance of an attractive mobile home.

Still another object is to provide a construction which is adaptable to a wide variety of mobile homes including those of substantially any width and any length, as well as those with roofs that are flat or curved, etc.

These and other objects and advantages will be apparent from the specification and the claims appended thereto, and the attached drawing in which:

Figure 1:
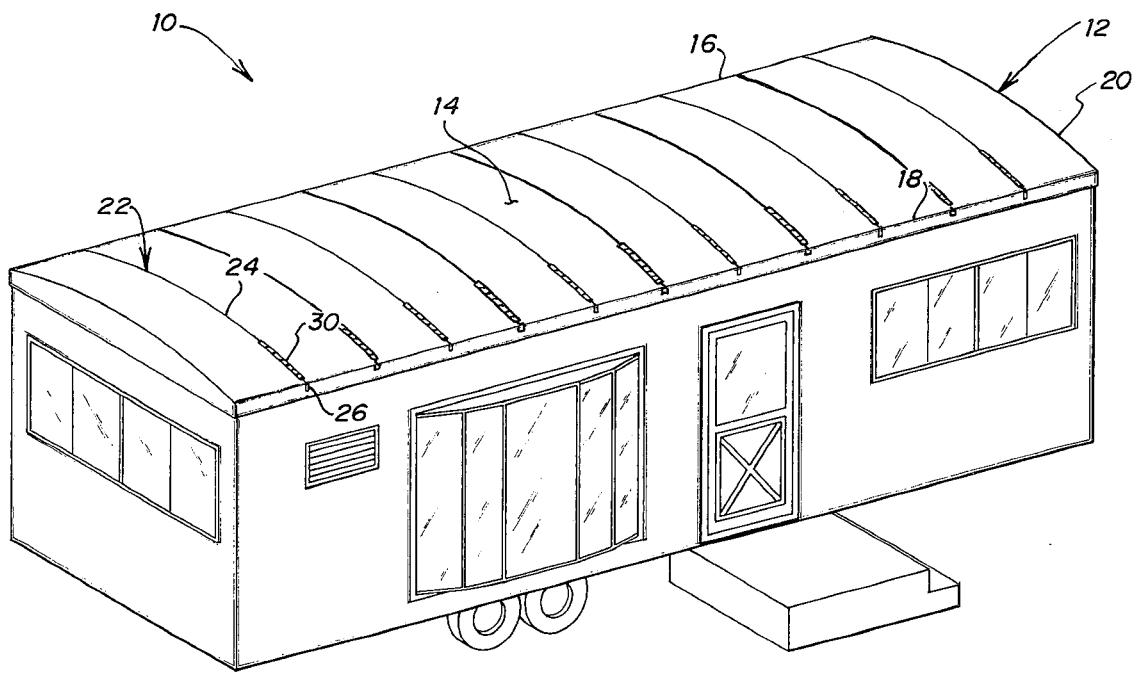
FIG. 1 is a perspective view of a mobile home having a plurality of the tension devices of the invention mounted over a membrane-type roof to quieten and stabilize the roof.

Referring initially to FIG. 1, a mobile home 10 is shown with a roof 12 which comprises a membrane 14 that extends from one edge 16 across to the opposite edge 18, and from the home's front 20 to the rear thereof. In some cases the membrane 14 may be formed of a unitary piece of metal such as aluminum; but, more likely the membrane will be created by laying a plurality of roofing panels side by side and then connecting their contiguous edges with mechanical joints that are appropriately described as seams. The roofing membrane 14 will typically be supported in its mid region by roof trusses (not shown), which provide the structural support that keeps the relatively light-weight membrane in a suitable position over the mobile home. While the membrane 14 will be supported by the central roof trusses, it will usually not be physically attached to said trusses; typically, the membrane will be rigidly attached only to the longitudinal members that extend along the edges 16, 18 of the roof 12. Hence, the membrane 14 can be said to "float" over the central roof trusses; of course, it is the "floating" nature of the construction which permits some relative movement during wind storms, and it is the noise that attends this relative movement that is frequently described as "roof rumble".

Figure 2:
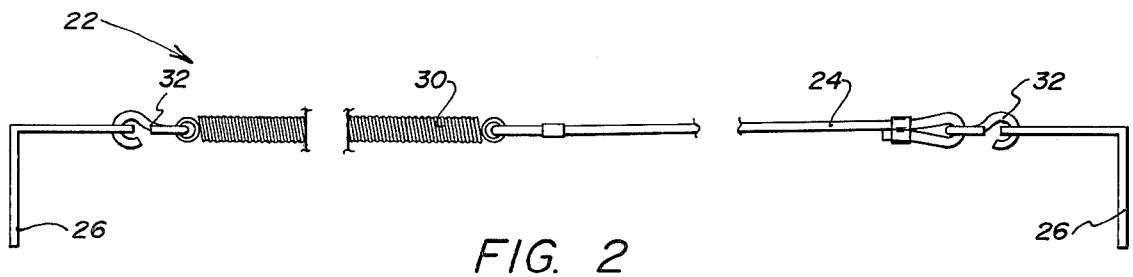
FIG. 2 is a side elevational view of one of the tension devices of the invention, with the device being shown in its relaxed state—prior to installation.

Stretched across the roof 12 according to the invention are a plurality of devices 22 for insuring the integrity of the roof when said roof is subjected to wind loads. Referring additionally to FIG. 2, the devices 22 comprise a plurality of straps or cables 24 which extend transversely across the roof, from one edge 16 to the opposite edge 18. The spacing of said straps 24 along the roof 12 is preferably such as to put the straps about four feet apart. However, the exact spacing may be varied somewhat, if desired, in order to cause a certain strap to lie directly over, or at least very near, a certain seam. The preferred spacing between straps of four feet was established through experimentation with a roof that was 14 feet wide. But it is believed to be not so much a home's width as it is its length that contributed the most to roof rumble; that is, the wind-induced ripples that seem to be most deleterious are those that are propagated by wind blowing longitudinally from one end of the mobile home to the other end. In fact, on some mobile homes a roof membrane can be seen to exhibit ripples almost like those that are manifested on a lake or a pond of water as wind blows thereacross. Of couse, a narrow mobile home will have a membrane whose edges are anchored closer together than the edges of a wide home—and this will inhibit vibration somewhat. But it is still believed to be the length of a home that has the most impact on the extent of a "rumble" problem.

With regard to experiments performed on a 14-foot roof, it has been found that spacing the straps as much as 6 feet apart will quieten a roof somewhat, but not so much as to render it essentially silent. Of course, putting the devices 22 as close as one or two feet apart would not necessarily hurt anything; but it would be wasteful, since a spacing of about four feet is usually quite adequate. If any extra straps are added, all of the straps should be located so as to reduce the relative spacing between all straps; otherwise, the extra straps would be present but not fully operational.

Figure 3:
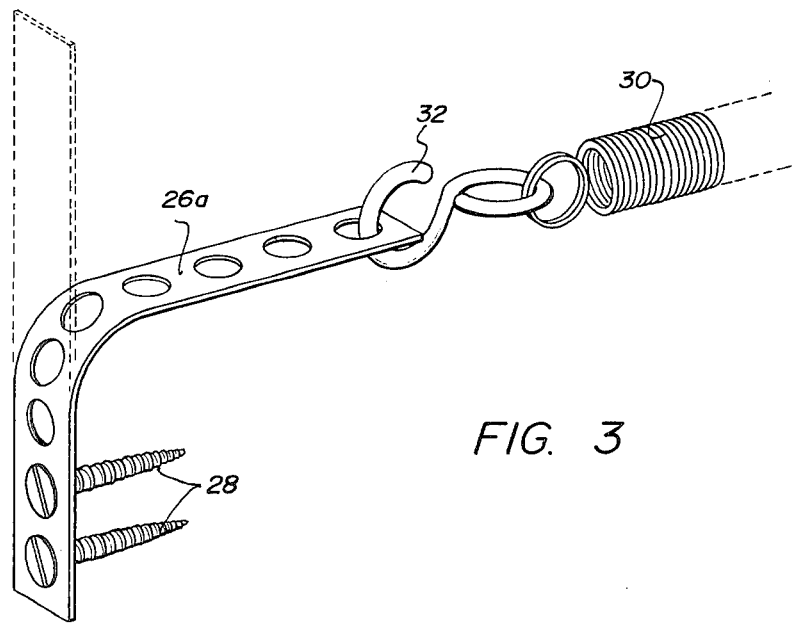
FIG. 3 is a perspective view of a "bracket means" for anchoring a cable to some structural part of a mobile home near the edge of the roof.

Rigidly fixed to the two opposite edges 16, 18 are a plurality of brackets 26 which are used to connect respective ends of the straps 24 to structural members along the edges 16, 18. Said brackets 26 may be specially formed or they may be general purpose 90° brackets that are commonly found in most every hardware store. Since some roofs for mobile homes are flat and others are gently curved or arched, a convenient bracket means comprises a heavy duty galvanized steel strap 26 having a plurality of apertures along its longitudinal axis. (Such steel strapping is commonly employed by plumbers and others in the construction trade, and is sometimes called plumber's tape.) A piece of the perforated straps 26A about 4 inches long can be connected with wood screws 28 along the outer (vertical) surface of an edge structural member, with an inch or more of the strap protruding vertically above the roof line. Subsequently bending that protruding inch or so inwardly toward the center of the roof 12 will provide an appropriate anchor for the straps 24. An examplary view of such a strap 26A—before it is bent to exactly match the contour of a roof—is shown in FIG. 3, in broken lines; it is shown in solid lines after it has been bent.

As will be described in greater detail hereinafter, the straps 24 are to be placed in tension in order to accomplish their intended purpose. For this reason, it is advisable that the brackets 26 be securely anchored to a substantial structural part of the roof; and, if convenient, placing the brackets 26 near such cross-braces as may be in the roof will add more strength to the over-all combination. That is, the ability of a spring 30 to establish an appropriate tension in the straps 24 will be directly related to the underlying strength of the structural parts of the roof. (If an attempt was made to anchor a spring to some structure that was incapable of resisting a desired tension load, then the desired tension could never be achieved, or—if ever once achieved—could never be sustained over a period of months or years.) A certain amount of latitude in positioning the brackets 26 is therefore both permissible and encouraged—as long as the separation between adjacent cables 24 is not much more than about four feet.

Another integral part of a tension device 22 is a spring 30, which preferably is a galvanized steel spring having a length of about 16 inches and a coiled diameter of about ½ inch. The spring should typically be relatively stiff, having a spring constant of about 2.5 lb/in; hence, stretching a 16 inch spring to about 27 inches will require a tension force of about 30 pounds. Suitable springs 30 formed of wire having a diameter of about 1/32 inch are commercially available from many sources.

In order to effectively use the devices 22 disclosed herein, the person having responsibilities for installing the devices would first make tentative locations for mounting the brackets along the top of each sidewall of the mobile home 10. The first of these tentative locations should be about 4 feet from the mobile home's front 20; and each subsequent location for a proposed mounting bracket would be about 4 feet further toward the rear of the trailer. Having established tentative locations for the brackets, a certain amount of adjustment could be made, if desired, so as to put brackets 26 slightly closer to a nearby seam in the roof membrane, or to put them directly over a known bracing member for the roof trusses. If it is desirable to move a given bracket more than just a few inches, then the adjacent bracket may also be moved a small amount so as to compensate for any increased gap between two brackets. The brackets 26 should then be rigidly secured to the structural members along the edges of the roof, i.e., the longitudinal members that serve as the major load-carrying elements at the intersection of a sidewall and the roof. Next, the straps or cables 24 will be laid loosely in place between appropriate brackets 26, and their ends processed so as to expedite easy connection with the brackets and to foster a long life. A preferred material for the straps 24 is braided nylon rope, and 1200 pound test rope having a diameter of about ¼ inch has been found to be quite adequate. When such rope is used, a suitable end connection can be formed by bending one end of the rope back upon itself to form a loop about 1 inch long, and then cinching the end of the rope to the main body through use of a metal clip. Too, a short tubular piece of metal can be crimped in the middle to hold the rope and form a loop near the end that can be considered practically permanent.

As for the length of the strap 24, it will be sized so as to extend across the roof membrane from one bracket to near an opposite bracket, but with a gap significantly longer than the length of the springs 30 which are to be employed. Hence, even when a helical spring 30 is joined to the end of a strap 24, there will still be a significant distance between two spaced brackets—which distance must be accommodated by stretching the coiled spring. The optimum tension in said springs 30 will be on the order of 30 pounds. To expedite connection of the straps 24, the brackets 26, and the springs 30, S-type hooks 32 may be advantageously used.

As for the orientation of the straps 24, there will be fewer straps required for essentially the same benefit if the straps extend straight across the roof membrane so that the straps are perpendicular to the sides of the mobile home. It would be possible, however, to place a strap in a slightly inclined mode between, say, a bracket that is eight feet from the front along one side of the home and a bracket which is 12 feet from the front along the other side of the home. However, by inclining the straps with regard to the longitudinal axis of the mobile home, there is some extra strain on the brackets 26 for a given amount of tension in the straps 24. Hence, the simplest and most direct technique of using a perpendicular orientation has been found to be the most desirable technique for biasing a roof membrane against any relative movement in a vertical direction, i.e., to bias it against any vibration that might create noise.

While only a preferred embodiment of the invention has been described herein and shown in the accompanying drawings, it should be evident that various modifications are possible with regard to the structure described herein, all of which could be made without departing from the scope of the invention. For example, galvanized steel straps could be used in place of the preferred braided nylon rope. Too, a continuous rope that extends back and forth across the roof in a serpentine fashion could be substituted for a plurality of shorter ropes, etc. These and other modifications will no doubt be apparent to those skilled in the art.

What is claimed is:

1. Apparatus for insuring the integrity of the roof on a mobile home when said roof is subjected to wind loads, comprising:
    a. a plurality of straps adapted for extending transversely across the roof of a mobile home, with the quantity of said straps being such that they are spaced about four feet apart along the length of the mobile home, and the straps being in contact with the roof along a substantial portion of their length, and the length of said straps being significantly shorter than the width of the mobile home, such that a substantial gap remains between one end of a strap and the adjacent edge of the roof when a strap is layed across the roof in a side-to-side direction;
    b. bracket means adapted for rigidly connecting respective ends of said straps to structural members along the side edges of the roof; and
    c. spring means for continuously maintaining a tension of about 30 pounds in said straps between said bracket means, whereby the roof underneath said straps is biased against any upward movement by said tensioned straps.

2. The apparatus as claimed in claim 1 wherein said spring means for maintaining the straps in tension constitute coil springs having a spring constant of about 2.5 lb/in.

3. The apparatus as claimed in claim 1 wherein said straps constitute braided nylon rope having a diameter of about ¼ inch and rated at 1200 pound test.

4. The apparatus as claimed in claim 1 wherein said spring means for maintaining the straps in tension constitutes a plurality of coil springs, each having a formed diameter of about ½ inch and a length of about 16 inches, with said springs being formed from wire having a diameter of about 1/32 inch.

5. The combination comprising:

a. a mobile home having a membrane-type roof suspended over a plurality of roofing trusses, and the roof membrane being formed from a series of large panels secured together at their adjacent edges so as to form seams in the roof, and the membrane being secured to the trusses and other structural members with conventional fasteners;

b. a plurality of brackets for attachment to the structural members along the edges of the roof, and said brackets having means for engaging the ends of a strap member, and said brackets being spaced approximately four feet apart along the edges of said roof;

c. a plurality of flexible but non-stretchable straps extending transversely across the roof of the mobile home, with there being one strap for each pair of brackets on opposite sides of the roof, and the length of said straps being less than the width of the mobile home; and d. a plurality of helical springs including one spring for each strap, and the straps being sized such that a spring which connects one end of a strap to a bracket must be placed in tension in order to permit the opposite end of the strap to be connected with an opposite bracket, with said tensioned springs serving to keep the straps in contact with the membrane-type roof but not connected to same, whereby the roof is restrained by the straps against any upward movement as a result of wind gusts.

6. The apparatus as claimed in claim 5 wherein the spring constant for each of the helical springs is about 2.5 lb/in, and the deflection imparted to said springs so as to put the straps in tension is well below the elastic limit of said springs.

7. The apparatus as claimed in claim 5 wherein the tension established in said straps is about 30 pounds when the wind load on the straps is zero.

8. The method of preventing a membrane-type roof on a mobile home from vibrating in response to wind loads, comprising the steps of:

a. placing a plurality of spaced straps adjacent the membrane-type roof in such a way that the straps are in contact with said roof over a substantial portion of their length but not rigidly connected to said roof, with said straps extending transversely across the roof from one side to the other, and the straps being permanently secured to the mobile home near the edges of the roof so that the straps travel with the mobile home wherever it is moved, with the straps being spaced about four feet apart along the length of the mobile home; and b. placing said straps in tension such that the roof is continuously biased downward against the supporting trusses by said straps, such that wind loads that would otherwise tend to flex the membrane are resisted by tension loads in the straps, and the tension which is imparted to said straps is about 30 pounds.

9. The method as claimed in claim 8 wherein the straps are oriented perpendicularly to the longitudinal axis of the mobile home.

* * * * *